United States Patent
Connell (10) Patent No.: US 6,854,570 B2
(45) Date of Patent: Feb. 15, 2005

(54) BRAKE CYLINDER PARKING BRAKE SYSTEM

(75) Inventor: Jason Connell, Bethel Park, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/438,141

(22) Filed: May 14, 2003

(65) Prior Publication Data
US 2004/0226779 A1 Nov. 18, 2004

(51) Int. Cl.[7] .............................................. B61H 13/00
(52) U.S. Cl. ........................ 188/33; 188/52; 188/170; 188/3 R
(58) Field of Search ................... 188/33, 265, 170, 188/197, 196 P, 200, 202, 203, 106 F, 107, 52, 3 R; 303/128, 86, 7, 15, 20, 71, 2, 3, 77

(56) References Cited

U.S. PATENT DOCUMENTS

| | | | |
|---|---|---|---|
| 3,101,814 A | * | 8/1963 | Newell ........................ 188/203 |
| 3,595,347 A | * | 7/1971 | Billeter ........................ 188/202 |
| 3,731,766 A | | 5/1973 | Campbell |
| 3,757,908 A | | 9/1973 | Fisher |
| 3,780,837 A | | 12/1973 | Haydu |
| 3,907,078 A | | 9/1975 | Means |
| 4,033,629 A | | 7/1977 | Spalding |
| 4,060,152 A | | 11/1977 | Bogenschutz et al. |
| 4,068,746 A | | 1/1978 | Munechika |
| 4,312,428 A | | 1/1982 | Beacon |
| 4,493,246 A | * | 1/1985 | Dalibout ................. 188/196 P |
| 4,613,016 A | | 9/1986 | Hart et al. |
| 4,662,485 A | | 5/1987 | Kanjo et al. |
| 4,733,602 A | | 3/1988 | Smith et al. |
| 4,746,171 A | | 5/1988 | Engle |
| 4,793,446 A | | 12/1988 | Hart et al. |
| 4,978,178 A | | 12/1990 | Engle |
| 5,361,876 A | | 11/1994 | Haverick et al. |
| 5,507,368 A | | 4/1996 | Barefoot |
| 5,558,412 A | * | 9/1996 | Kanjo et al. .................. 303/86 |
| 5,738,416 A | * | 4/1998 | Kanjo et al. ................... 303/7 |
| 6,027,180 A | | 2/2000 | Greenaway et al. |
| 6,148,966 A | | 11/2000 | Daugherty, Jr. et al. |
| 6,241,057 B1 | | 6/2001 | Hiatt |
| 6,253,886 B1 | * | 7/2001 | Brugait et al. .............. 188/170 |
| 6,279,689 B1 | | 8/2001 | Zemyan |
| 6,305,504 B1 | | 10/2001 | Ring |
| 6,378,668 B1 | | 4/2002 | Zemyan et al. |
| 6,397,986 B2 | | 6/2002 | Moore |
| 6,578,679 B2 | * | 6/2003 | Hill et al. ................... 188/170 |

* cited by examiner

Primary Examiner—Robert A. Siconolfi
Assistant Examiner—Melanie Torres
(74) Attorney, Agent, or Firm—Buchanan Ingersoll PC (57) ABSTRACT

An automatic parking brake for a rail vehicle can lock the rail vehicle brakes in an applied position, such as by blocking the brake cylinder piston push rod from moving from an applied position to a release position. A control mechanism can be provided to remotely operate the automatic parking brake. A manual release can also be provided.

9 Claims, 6 Drawing Sheets

BRAKE CYLINDER PARKING BRAKE SYSTEM

BACKGROUND

This invention relates generally to a parking brake for a rail vehicle braking system, and more particularly to a brake cylinder parking brake which can automatically lock the brakes on the rail vehicle in an applied position responsive to a brake application. The brake cylinder parking brake can be configured for use on both truck and car mounted rail car brake systems.

As is generally well known in the rail industry, when rail cars are taken out of a train and parked at a siding or yard, the hand brake or parking brake on at least some of these cars is applied as a precaution against unwanted or unexpected movement of the cars. A typical rail car hand brake system normally consists of an apparatus for manually applying and biasing one or more brake shoes against the tread of one or more wheels of the rail car by either turning a hand wheel or pumping a ratchet handle on a hand brake mechanism attached to the rail car.

In both truck and car mounted rail car braking systems (illustrated in FIGS. 1–3), the hand brake mechanism is usually either a cast or stamped metal gear housing, and is typically attached to an outside end wall of the rail car. A rotatable chain drum must be rotated by turning the hand wheel to wind a brake chain onto the chain drum. The other end of the brake chain normally extends through the bottom of the gear housing and is interconnected with cable or other linkage, such as a hand brake lever, to the brake beams which carry the brake shoes. The winding of the brake chain onto the chain drum applies tension to the brake chain and brake linkage to draw the brake shoes against the tread surfaces of adjacent rail car wheels and, accordingly, applies the hand brake as intended.

A disadvantage of this prior art type hand brake arrangement is that train operators must manually apply the parking brake on each of dozens, or even hundreds, of rail cars, which requires a considerable amount of time and labor. Additionally, the operators must be certain that the hand wheel is turned a sufficient amount to ensure that the parking brake is engaged. The possibility also exists that an operator may forget to apply the brake altogether on a rail car, which could result in unexpected movement of the rail car while parked at the siding or yard. Alternatively, wheel damage can result due to a failure to release the handbrake from the applied position before the train resumes movement. Operation of the hand wheel also requires exerting a considerable amount of physical force from an awkward position, which makes the hand brake difficult to apply. Injuries to operators also sometimes occur related to hand brake use. Furthermore, since brake cylinder pressure can leak over time, a potentially hazardous condition can develop if a loss of brake cylinder pressure occurs subsequent to an emergency brake application, and particularly if the train is stopped on a grade.

A loaded brake engagement mechanism has been used in Type AB-8 and AB-10 Manual Empty and Load Freight Car Brake Equipments, manufactured By Westinghouse Air Brake Technologies, Inc., the assignee of the present invention. As described in *Instruction Pamphlet* 5062–2*Sup.* 1, dated May 1942, this mechanism incorporated a telescoping housing and push rod arrangement inside a specially designed "UL" type brake cylinder, called a "load brake cylinder" which was used to make a loaded brake application. The load brake cylinder was one of two separate brake cylinders on the rail vehicle, the other being an "empty brake cylinder", which where used to control the application of brakes on the rail vehicle. The piston push rods of each brake cylinder were connected to a common lever, called the live cylinder lever, which was connected to the brake rigging on the rail car. In the load brake cylinder, the push rod telescoped within a hollow tube, or housing, and the relationship between the housing and the push rod was regulated by a ratcheting mechanism which cooperated with notches in the push rod. During a loaded brake application, the empty brake cylinder would operate and, via the connection of the push rods of both the empty and load brake cylinders to the live brake cylinder lever, the push rod of the load brake cylinder would extend along with the push rod of the empty brake cylinder. The ratcheting mechanism cooperated with the notches on the push rod of the load brake cylinder such that as it extended, i.e., telescoped, out from the housing, it would be blocked from retracting into the housing. When the empty brake cylinder reached maximum extension of the push rod, the load brake cylinder could be pressurized which caused the housing to extend. Since the ratcheting mechanism had locked the push rod in its telescoped position relative to the housing, the push rod was caused to further extend an additional amount along with the housing, thereby increasing the braking force. Basically, the telescoping function of the push rod with respect to the housing, controlled via the ratcheting mechanism, permitted a longer piston stroke in a more compact manner. However, the ratcheting mechanism only blocked the push rod from retracting within the housing itself. The ratcheting mechanism did not block the housing from retracting, and carrying the push rod long with it, which released the brakes.

Some embodiments of a rail vehicle parking brake which is adapted to address such disadvantages of conventional rail vehicle parking brakes are described in copending U.S. Provisional Application Ser. No. 60/501,383, assigned to the assignee of the present invention, the disclosure of which is hereby incorporated herein by reference.

Additionally, further embodiments of a parking brake for a rail vehicle which can be applied automatically to lock the brakes on the rail vehicle are disclosed hereinafter.

SUMMARY

According to the invention, a parking brake associated with the brake cylinder of a rail vehicle, such as a freight car, is provided which can automatically lock the rail vehicle brakes after a brake application to hold the rail vehicle brakes in the applied position. This can be accomplished by blocking the ability of the brake cylinder piston push rod to move to from the applied position to the release position. A control mechanism can be used to selectively to apply or release the parking either automatically or manually. The parking brake can employ a blocking device which permits movement of the piston push rod in a first direction to apply brakes on the rail vehicle, yet prevents subsequent movement in the opposite direction to release the brakes. For example, the push rod, or a housing surrounding the push rod, can be engaged by a locking portion such that extension of the push rod, or housing, is permitted while subsequent retraction is blocked, thereby preventing the brakes from being released until the locking portion releases engagement with the push rod, or housing. The locking portion can be a ratcheting member and the push rod, or housing, can be provided with notches which are engaged by the ratcheting member. The control mechanism can be remotely controlled, such as pneumatically, to selectively control the position of the locking portion, whereby the locking portion can be disengaged to release the bar, or the locking portion could be positioned to engage the bar only under certain circumstances. The blocking device can be housed with the non-pressure head of the brake cylinder, and can be connected, for example pneumatically, to the control mechanism to control the position of the locking portion.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
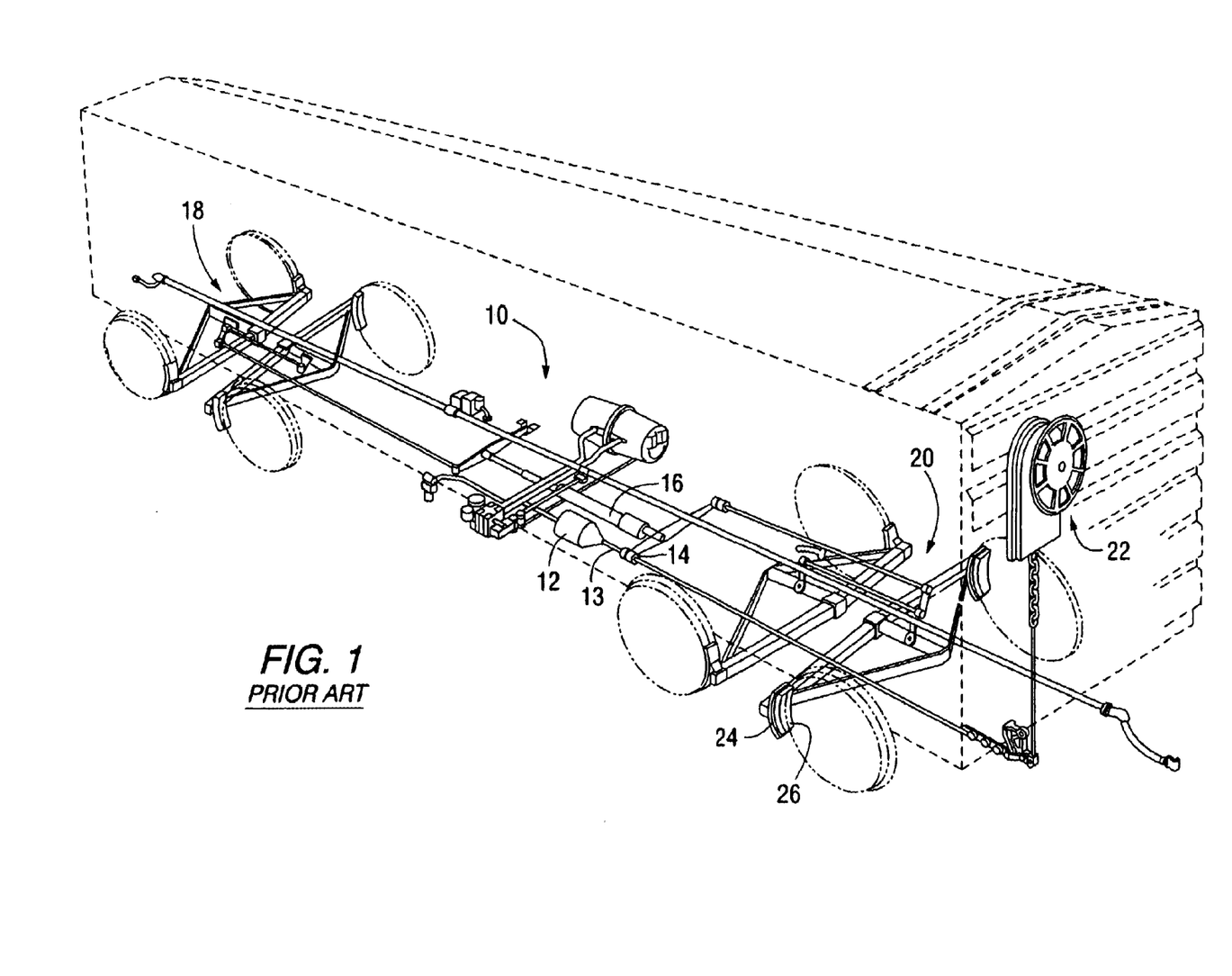
FIG. 1 is a plan view of a prior art type car-mounted brake system having a conventional prior art hand wheel hand brake or parking brake.
Figure 2:
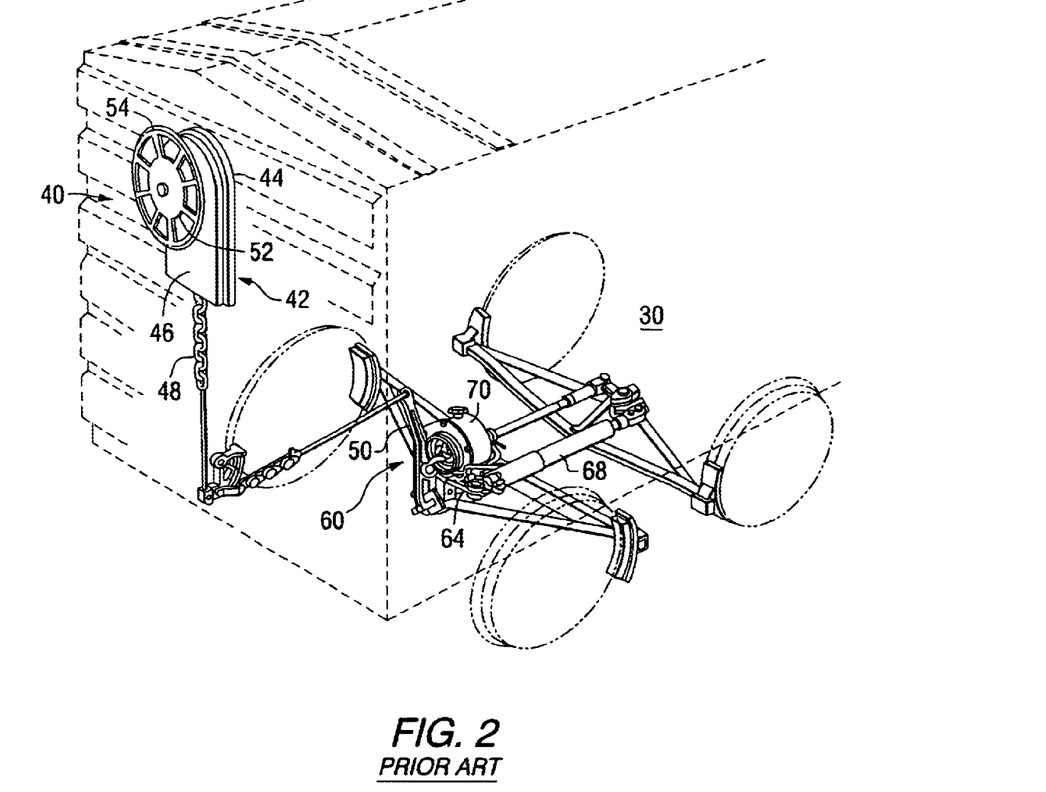
FIG. 2 is a plan view of a prior art type truck-mounted brake system having a conventional prior art hand wheel hand brake or parking brake.
Figure 3:
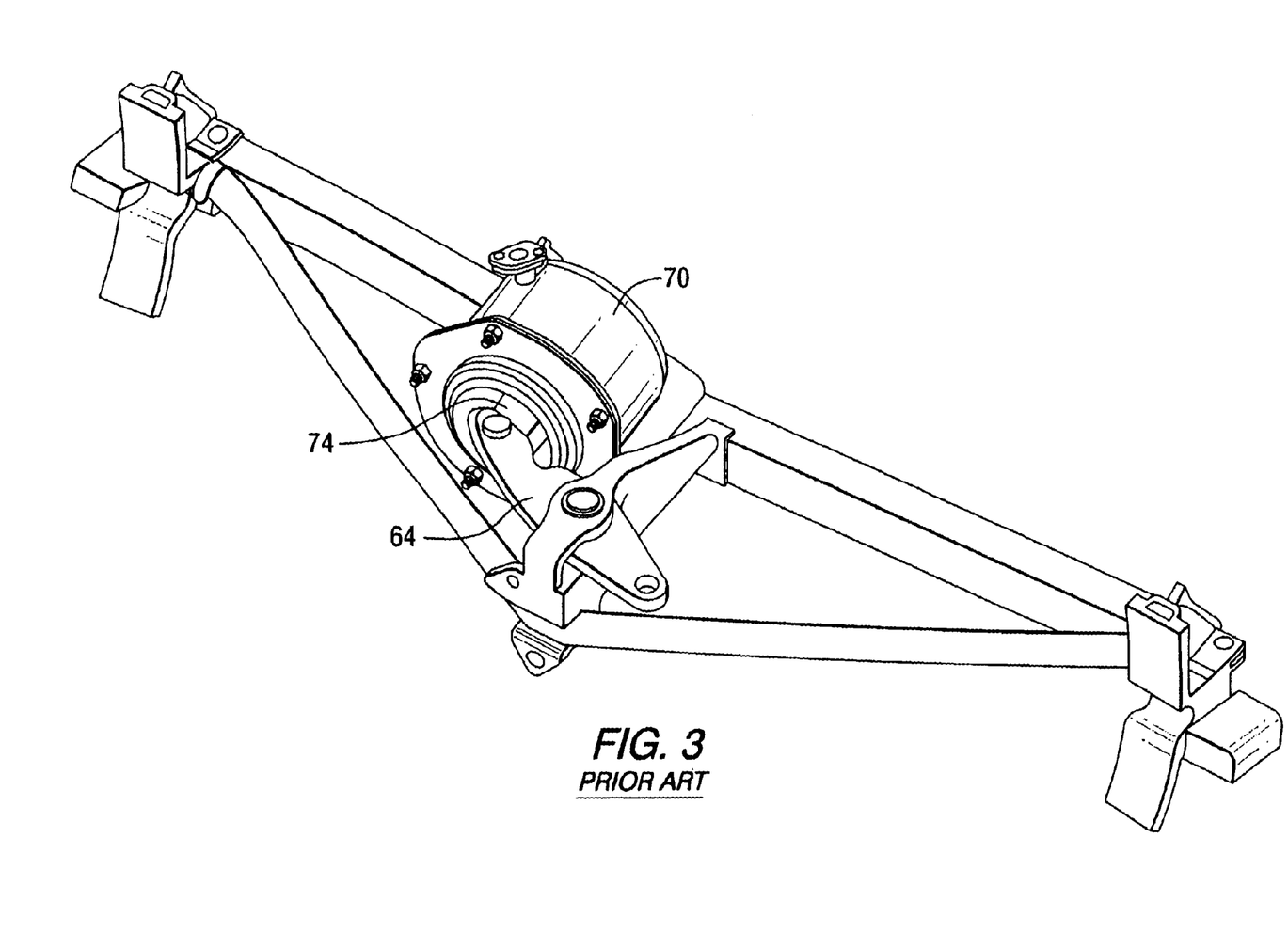
FIG. 3 is an enlarged view of a portion of the truck-mounted brake system shown in FIG. 2, showing more details of the brake cylinder.

Referring now to the drawing figures wherein like reference numbers refer to similar parts throughout the several views, prior art rail vehicle braking systems are shown in FIGS. 1–3, which illustrate both car and truck mounted braking systems, respectively.

FIG. 1 shows a prior art car mounted brake assembly, generally designated 10, for a rail vehicle. The car mounted brake assembly 10 includes a brake cylinder 12 having a piston push rod 13 connected to a cylinder force transfer lever 14. A slack adjuster 16 is also shown associated with the cylinder force transfer lever 14, and a pair of brake beams 18 and 20 are mounted at each end of the car mounted brake assembly 10. A hand brake or parking brake 22, is also provided which is associated with the cylinder force transfer lever 14. The brake beams 18, 20 are actuated by the brake cylinder 12 or the hand brake 22, via the cylinder force transfer lever 14 and a series of additional levers and linkages. Brake levers are used throughout the braking system to transmit, increase, or decrease braking force, as well as to transfer or change direction of force. Thus, during a braking situation wherein a force is applied by the brake cylinder 12 or the hand brake 22, these levers and rods transmit and deliver braking forces to the brake beams 18 and 20 and, consequently, to the brake heads 24 and brake shoes 26 mounted thereon.

Referring to FIGS. 2 and 3, a prior art truck mounted brake system 30 is shown. The hand brake mechanism 40 has a housing 42 including a back wall 44 mountable on a rail car and a cover 46. The cover 46 is secured to the back wall 44. A chain 48 for application or release of the brakes is connected, as is conventional, to the brake rigging via a hand brake lever 50, and is attached to and wound on a winding drum 52. The hand brake lever 50 is, in turn, connected to cylinder force transfer lever 64. In order to apply the brakes, a hand wheel 54 is rotated in a clockwise direction to wind the chain 48 about the winding drum 52 and to cause the hand brake lever 50 to be pulled in an outward direction away from the brake rigging, generally designated 60. This causes the cylinder force transfer lever 64 to be rotated in a counterclockwise direction resulting in the piston push rod 74, shown in FIG. 3, being pulled in an outward direction and the required force being applied to the slack adjuster assembly 68. This force is similar to the force which is applied by the brake cylinder piston rod, not shown, of the air cylinder assembly 70 when such is pressurized.

Figure 4:
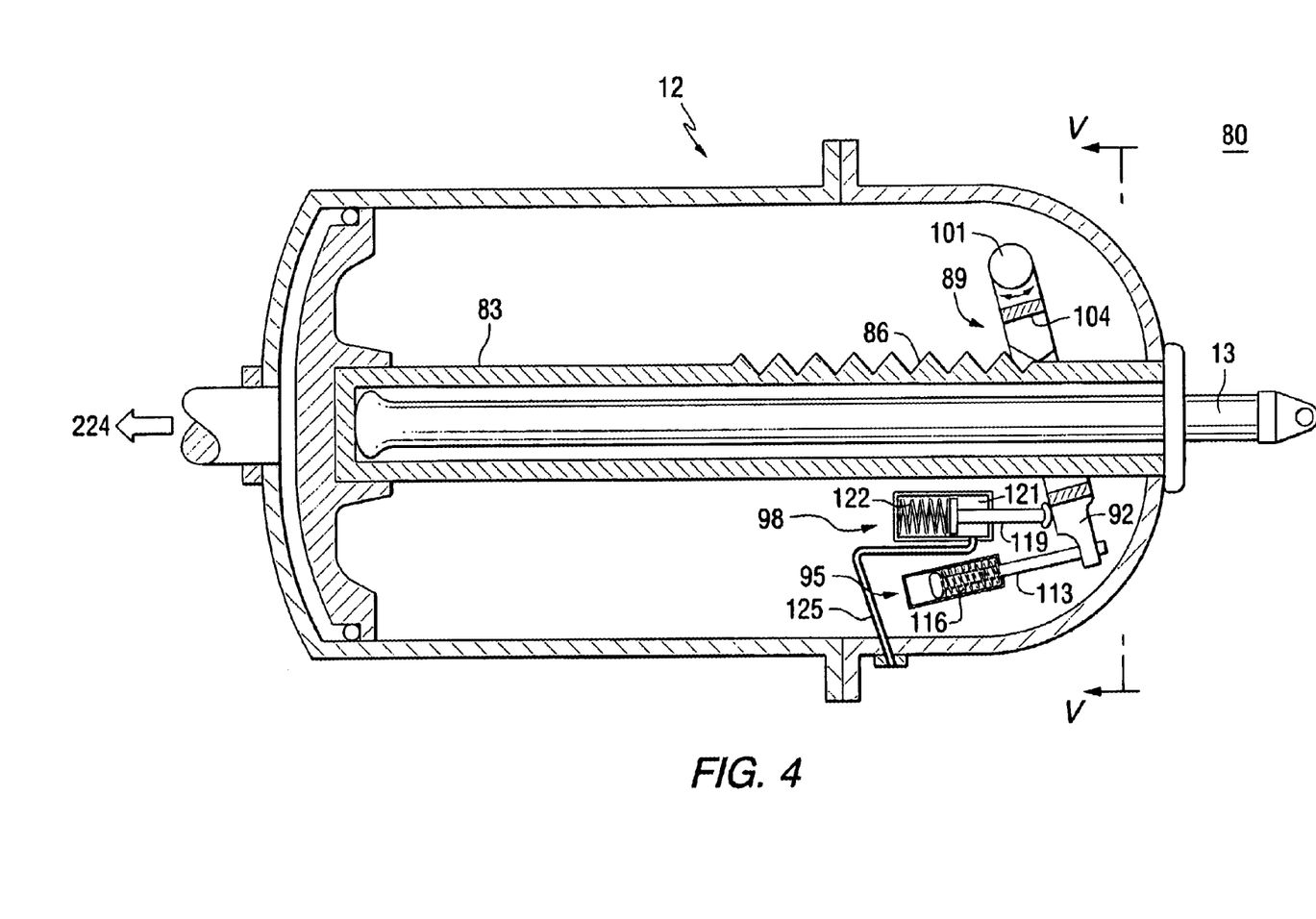
FIG. 4 illustrates an embodiment of a brake cylinder parking brake according to the invention.
Figure 5:
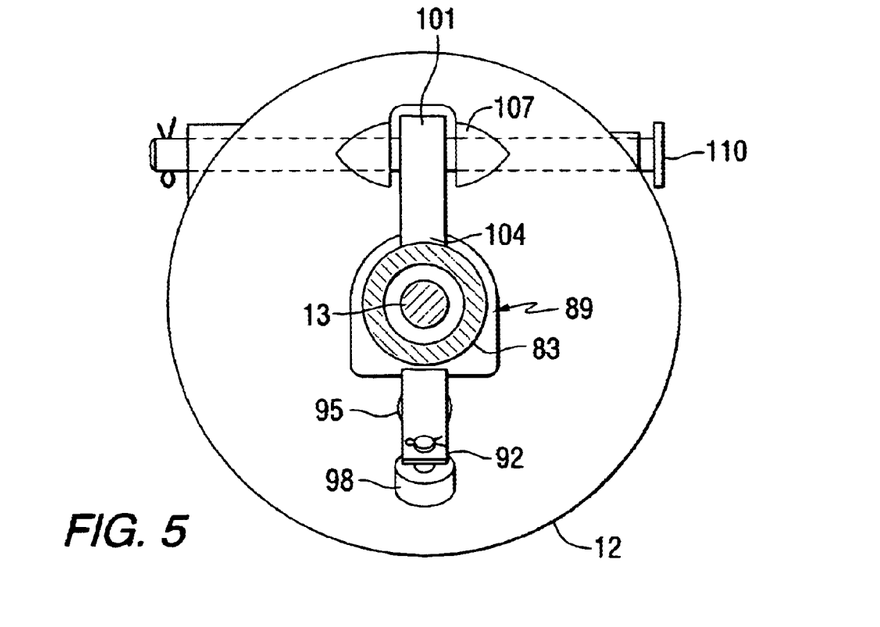
FIG. 5 is a view taken along line V—V in FIG. 4.

FIGS. 4 and 5 illustrate an embodiment of the brake cylinder parking brake 80, as it might be used, for example, with the brake cylinder 12 on the car mounted braking system 10 shown in FIG. 1. However, it should be understood that the brake cylinder parking brake 80 could also be utilized with the brake cylinder 70 on the truck mounted braking system 30 shown in FIGS. 2 and 3. As shown, the brake cylinder parking brake 80 can be a ratcheting mechanism which can be enclosed in the "non-pressure head" of the brake cylinder 12. The brake cylinder on a rail car, particularly a freight car, typically comprises a brake cylinder body enclosing a piston, one end of which is attached to brake rigging for applying the brakes on the rail car. The brake cylinder is basically divided into two chambers by the piston. The chamber acting on the face of the piston, opposite the end of the piston attached to the brake rigging, can be pressurized to move the piston to apply the brakes, or depressurized to release the brakes. The chamber on the opposite side of the piston face is sometimes referred to as the "non-pressure head" of the brake cylinder. Locating the parking brake in the non-pressure head of the brake cylinder can facilitate conversion of existing brake cylinders.

The parking brake 80 can employ a housing 83 in which the push rod 13 is disposed. The push rod 13 can be enclosed by the housing 83 in a manner such that the push rod 13 must move with the housing 83 both in extension and retraction. In this manner, control over the movement of the housing 83 results in corresponding control over the movement of the push rod 13. The outer surface of the housing 83, or a portion thereof, can be provided with notches 86. Alternatively, it should also be understood that the surface of the push rod 13 could be notched, such that a separate housing 83 with notches 86 would not be necessary.

The brake cylinder parking brake 80 can further include a ratcheting assembly 89 which can have a first end 92 connected to first 95 and second 98 position control members, and a second end 101 to which is rotatably connected a locking portion 104. The operation of ratcheting mechanisms is well known in the art. The locking portion 104 is positioned adjacent the notches 86 on the housing 83 for cooperation therewith in a well known manner to permit movement of the housing 83 in a first direction to apply brakes on the rail vehicle, but prevent subsequent retraction of the housing 83 in a second direction to release the brakes. Since the push rod 13 is constrained to move with the housing, any restriction of the movement of the housing 83 equally restricts the movement of the push rod 13.

Referring more particularly to FIG. 5, the ratcheting assembly 89 can be pivotally connected to the inside of the non-pressure head of the break cylinder 12. In the embodiment shown, the second end 101 of the ratcheting assembly 89 can be connected via a boss 107 and a retaining pin 110. The boss 107 can be formed on the inside of the non-pressure head. However, it is to be understood that the particular design illustrated is merely exemplary for purposes of describing the invention. Alternative ways to pivotally connect the ratcheting assembly 89 inside the non-pressure head of the brake cylinder 12 can also be devised by those skilled in the art.

The first positioning member 95 can cooperate with the first end 92 of the ratcheting assembly 89 and can basically urge the ratcheting assembly 89 toward a release, or non-activated, position whereat the locking portion 104 is disengaged from the notches 86 on the housing 83. At this position, the housing 83, and thus the push rod 13, is free to move in both directions. The second positioning member 98 can also cooperate with the first end 92 of the ratcheting assembly 89, but urges the ratcheting assembly 89 in the opposite direction, towards an activated, engaged position at which the locking portion 104 engages the notches 86 on the housing 83. At this position, the locking member 104 will permit the housing 83, and thus the push rod 13, to extend to apply the brakes, but will prevent the housing 83, and thus the push rod 13, from subsequently retracting to release the brakes.

As shown, the first positioning member 95 can include a first rod 113 having one end attached to a distal portion of the first end 92 of the ratcheting assembly 89. An opposite end of the first rod 113 can be biased, for example by a first spring 116, which urges the first rod 113, and thus the ratcheting assembly 89, in a direction which would cause the locking member 104 to disengage from the notches 86 in the housing 83.

The second positioning member 98 can similarly include a second rod 119, one end of which can be enclosed within a chamber 121 that is selectively communicable with a source of pressure. An opposite end of the second rod 119 acts against the ratcheting assembly 89. Within the chamber 121 enclosing the end of the second rod 119, a resilient member, such as a spring 122, can be provided which acts on the end of the second rod 119 enclosed in the chamber 121. The second spring 122 normally biases the second rod 119 against the first end 92 of the ratcheting assembly 89. Thus, the second spring 122 normally causes the second positioning member 98 to urge the ratcheting assembly 89 in the opposite direction urged by the first positioning member 95, toward a position at which the ratcheting assembly 89 is in an activated state. In the activated state, the locking portion 104 will engage the notches 86 in the housing 83 if the push rod 13 is extended to apply the brakes. A source of pressure can be selectively communicated, for example via a tube 125, to the chamber 121 to overcome the force of the second spring 122 to control the movement of the second rod 119. Consequently, control of the second positioning member 98 can be controlled by selectively pressurizing the chamber 121 to compress the second spring 122. Compressing the second spring 122 permits the second rod 119 to retract, thereby removing the force normally holding the ratcheting assembly 89 in the activated position. With the force of the second spring 122 overcome, the force of the first spring 116 in the first positioning member 95 can cause the ratcheting assembly 89 to move in the opposite direction, disengaging the locking portion 104 from the notches 86 in the housing 83. Thus, when the chamber 121 is pressurized, locking portion 104 is disengaged from the notches, permitting the housing 83, and thus the push rod 13, to retract to release the brakes on the rail car. Controlling pressurization of the chamber 122 therefore controls engagement and disengagement of the brake cylinder parking brake 80.

In one embodiment, the force exerted by the second spring 122 can be designed to normally hold the ratcheting assembly 89 in the activated state. In this design, the ratcheting assembly 89 will generally be held in the activated position whereat the locking portion 104 will engage the notches 86 in the housing 83 upon extension of the housing 83 and enclosed push rod 13. The ratcheting assembly 89 will be held in this state, until, and unless, the chamber 121 of the second positioning member 98 is pressurized to overcome the force of the second spring 122 acting on the rod 119. When release is desired, the chamber 121 can be pressurized to permit the first positioning member 95 to move the ratcheting assembly 89 to the deactivated position.

Figure 6:
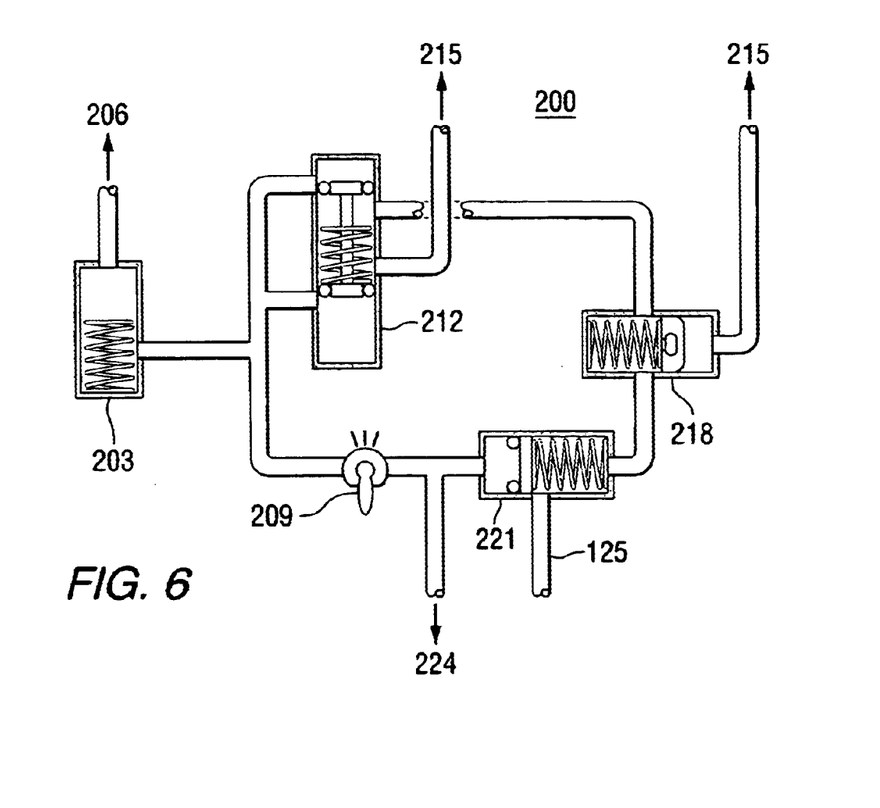
FIG. 6 illustrates an embodiment of a control mechanism for a brake cylinder parking brake such as shown in FIG. 4.

Referring now to FIG. 6, it can be desirable to have a controller, or control system 200, to remotely operate the locking function of the brake cylinder parking brake 80. In the embodiment illustrated, the control system 200 can include several members that can be selectively communicated with, or selectively control communication between, one or more of the brake pipe, brake cylinder, emergency reservoir, and the signal pipe, i.e. tube 125, to the second positioning member 98. In the embodiment shown, these members can include a variable check valve 203 between the emergency reservoir 206 and a three way cock 209, an emergency application sensor check valve 212 communicating between one or more of a brake cylinder check valve 224 (not shown), the brake pipe 215, and the emergency reservoir 206, a brake pipe check valve 218 communicating with the brake pipe 215, and a parking brake check valve 221 intermediate the signal pipe 125 to the parking brake 80 and one or both of the three-way cock 209 and the brake pipe check valve 218.

The control mechanism 200 can cause the parking brake 80 to engage or disengage the housing 83 responsive to the presence or absence of a pressure in the signal pipe 125. The control mechanism 200 can be used to apply or release the parking brake 80 either automatically or manually. The control mechanism 200 can use a source of pressure, such as, for example, the emergency reservoir 206, to control the ratcheting assembly 89. The required pressure can be a function of the desired effective braking ratio of the rail car. The control mechanism 200 can also be rendered inoperative if available pressure is lower than desired, such as by using check valves, such as the variable check valve 203.

The parking brake device 80 can be designed to automatically engage and/or disengage whenever certain predetermined conditions are met, such as, for example, when an emergency brake application has been made or pressure in the brake pipe 215 falls below a predetermined pressure. Similarly, the parking brake 80 can be designed to automatically disengage whenever brake pipe pressure rises above a predetermined pressure. Unless manually overridden, the parking brake 80 can be designed such that it will not engage when certain conditions are met, such as when brake pipe pressure is above a predetermined value, or when brake cylinder pressure is below a certain pressure, or when there has not been an emergency brake application.

In one embodiment, so long as the pressure in the emergency 206 reservoir remains above a predetermined setting the parking brake 80 can be manually applied and released by operating the three way cock 209 that introduces pressure into the brake cylinder 12 and signal pipe 125 or exhausts the pressure to atmosphere. The parking brake 80 can be designed to be operated regardless of the status of the brake system. The parking brake 80 could also be designed to automatically release once brake pipe pressure reached a predetermined level by the inclusion of another check valve arrangement (not shown) similar to the brake pipe check valve 218 provided between the parking brake check valve 221 and the signal pipe 125.

According to one method of operation of the control system 200, once emergency reservoir air pressure has reached a predetermined amount, sufficient to overcome the spring in the emergency reservoir check valve 203, emergency reservoir air will be permitted to flow to the emergency application sensor check valve 212 and the three-way cock 209. The three-way cock 209 can permit emergency reservoir air pressure to engage the brake cylinder 12 and the parking brake 80 via signal pipe 125 using manual operation. The three-way cock can be moved between three positions—one at which brake cylinder and signal pipe pressure is exhausted, one at which the emergency reservoir 206 can communicate with the brake cylinder 12 and the signal pipe 125 via the parking brake check valve 221, and one at which the brake cylinder 12 and the signal pipe 125 is isolated from the emergency reservoir 206. The three-way cock 209 can thereby provide a user with the option to manually release the parking brake 80 by exhausting the air pressure, or control the air pressure by interrupting all connections.

The emergency application sensor check valve 212 can detect the presence of an emergency brake application, and can allow the parking brake 80 to be applied by opening communication between the emergency reservoir 206 and the signal pipe 125, which communicates with the second position member 98 of the brake cylinder parking brake 80.

The brake pipe check valve 218, shown having an exhaust port, can be provided to cause the brake cylinder parking brake 80 to release automatically once brake pipe pressure rises to a predetermined level. Optionally, a brake cylinder check valve (not shown) could be provided between the three-way cock 209 and the brake cylinder 12 to allow emergency reservoir pressure to enter the brake cylinder 12, as directed by the three-way cock 209, only after the pressure exceeds a predetermined threshold.

In a release position, i.e., parking brake release during car charging, after brake pipe 215 reaches a predetermined pressure sufficient to overcome the brake pipe check valve 218 spring force, the check valve 218 moves, opening communication between the signal pipe 125 and the atmosphere, thus releasing the parking brake 80. This is the automatic release feature following automatic application of the parking brake 80 after an emergency application has been made. The parking brake check valve 221 is open in this instance and will close only if the parking brake 80 is being manually operated.

In an applied position, i.e., parking brake application following an emergency brake application, or if the pressure in the brake pipe 215 falls below a predetermined pressure while pressure in the emergency reservoir 206 remains above the pressure governed by the variable check valve 203, communication is opened between the emergency reservoir 206 and the signal pipe 125 via the emergency application sensor check valve 212. The low pressure in the brake pipe 215 can be insufficient to open the connection between the signal pipe 125 and the atmosphere by way of the brake pipe check valve 218 and thus, air is permitted to flow past the check valve 218 and the normally open parking brake check valve 221 to engage the parking brake 80. The brake pipe check valve 218, with exhaust port, can be designed such that if brake pipe 215 pressure is greater than a predetermined amount, such as the spring force in the brake pipe check valve 218, the signal pipe 125 will be connected to atmosphere via the exhaust port. Otherwise, the signal pipe 125 will remain connected to the emergency reservoir 206 through the check valve 218.

The purpose of the parking brake check valve 221 can be to permit manual operation of the parking brake 80 even if the brake pipe 215 is charged. Introducing pressure on the three way cock 209 side of the check valve 221 closes the connection between the signal pipe 125 and the atmosphere if brake pipe 215 pressure is above a certain level. Thus, an additional check valve (not shown) could be provided to automatically release the brakes after brake pipe 215 pressure reached a predetermined level. It an be preferably that the "release after emergency" function occur at a lower pressure, i.e., earlier, than a manual release. Consequently, the springs in such an additional check valve would preferably respond at a different pressure than the spring in the parking brake check valve 221.

Figure 7:
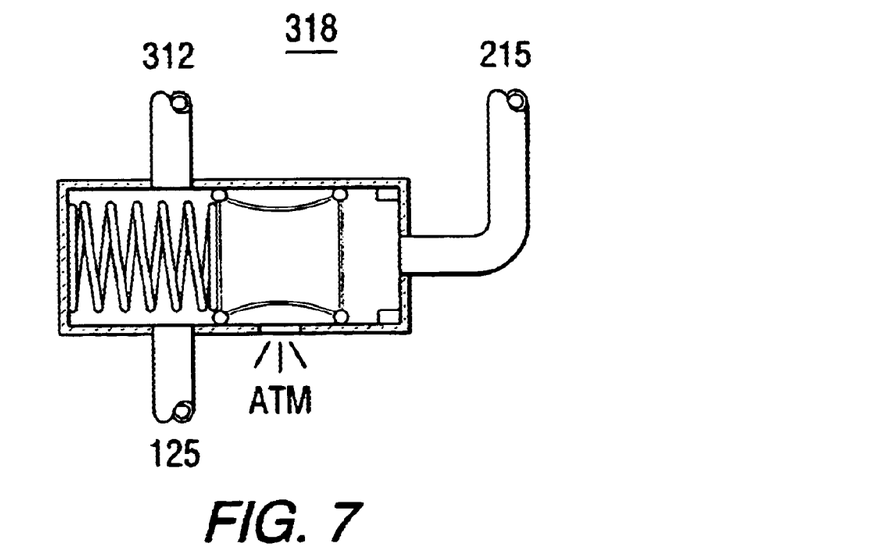
FIG. 7 illustrates an alternative embodiment of the brake pipe check valve shown in FIG. 6.
Figure 8:
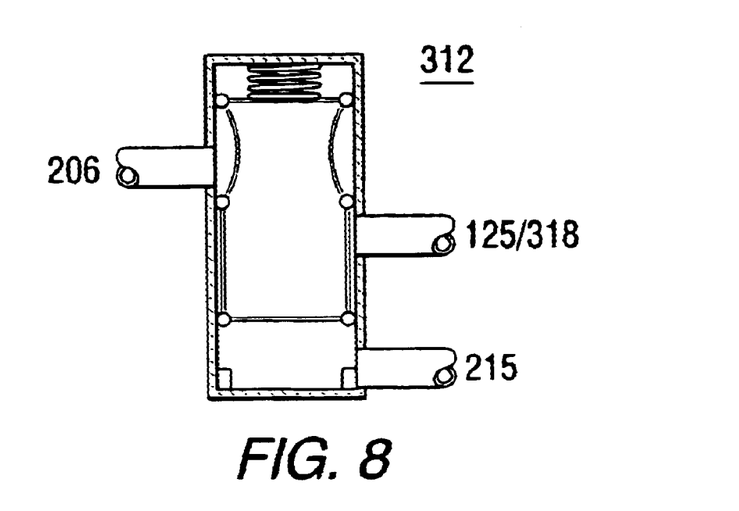
FIG. 8 illustrates an alternative embodiment of the emergency application sensor valve shown in FIG. 6.

Referring now to FIGS. 7 and 8, alternative embodiments of a brake pipe check valve 318 and an emergency application sensor valve 312, respectively, are illustrated. Generally, the valves 318 and 312 illustrated are spool valves. The spool valve design may be better suited for the functions to be carried out by the brake pipe check valve and emergency application sensor valve in the control mechanism 200. However, the operation and interplay between these two valves 318 and 312 can be the same as described above for the standard type valves 218 and 212 described previously.

The parking brake 80 can be designed to be normally activated, wherein the spring 122 in the second positioning member 98 causes the rod 119 therein to push the end of the ratcheting assembly 89 in a first direction. The ratcheting assembly 89 can normally be held in this position, whereat the locking portion 104 will automatically engage the notches 86 in the housing 83 if the push rod 13 extends, and thereby prevent subsequent retraction of the push rod 13. To release the locking portion 104, e.g., place the parking brake 80 in a "deactivated" state, pressure can be communicated, via the signal pipe 125, on the back of the rod in the second positioning member 98. This pressure opposes the spring 122 acting on the opposite side of the rod 112, and also assists the spring 116 in the first positioning member 95, which pulls the ratcheting assembly 89 in the opposite direction from that urged by the first positioning member 95. Aided by the pressure communicated via the signal pipe 125, the first positioning member 95 moves the ratcheting assembly 89 to the deactivated state, whereat the locking portion 104 is disengaged from the notches 86 in the housing 83. In this position, the push rod 13 is free to retract and release the brakes on the railcar. In one embodiment, emergency reservoir pressure can be used as the source of pressure which is supplied to the second positioning member via the signal pipe 125.

The basic operating principle of the brake cylinder parking brake 80 is that whenever brakes are applied on the rail vehicle, and perhaps more desirably after an emergency brake application, a the parking brake 80 can prevent an undesired release of the brakes. This can be accomplished, as described above, by locking the brake cylinder piston push rod 13 in the extended position thereby keeping the push rod 13 from retracting subsequent to a brake application. Once the parking brake 80 is applied, the rail vehicle would remain stationary similarly to having the handbrake engaged. Depending on the desired operating characteristics, the controlling mechanism 200 can be used to apply or release the parking brake 80 via automatic or manual operation. As explained previously, the parking brake 80 can be controlled to maintain the push rod 13 in the applied position subject to certain operating conditions. Moreover, the control system 200 can selectively apply or release the brake cylinder parking brake 80 automatically according to certain operating conditions. Automatic release of the parking brake 80 can be implemented, for example, responsive to restoration of brake pipe pressure. Alternatively, the parking brake 80 can be manually released at each car via the three-way cock 209. However, the parking brake blocking device is not designed to be operated manually, such as to hold cars during switching operations without air, for example. Consequently, a conventional handbrake can still be necessary for this purpose, and for the purpose of controlling the speed of rail cars in rider humping operations, as still used in some locations to bring cars through coal tipples.

Since the brake cylinder parking brake 80 can be automatically applied on all cars in a train essentially simultaneously, a great improvement in the ability of the parking brake 80 to hold a train on a grade without a locomotive would bring about improved safety in operations. Likewise the elimination of the necessity for crewmen to apply handbrakes on cars when they are set out, or release them when cars are picked up, would both speed operations and reduce the number of wheels damaged by dragging handbrakes. If applied in a service where electrically controlled brakes were used, a further refinement can be to provide for a release of the automatic parking brake independent of brake pipe restoration. This can be done to permit charging of trainlines while safely holding the cars in the train. Furthermore, since the high force and energy necessary to apply the parking brake is provided by equipment that is already part of the car, the cost of a simple holding mechanism could be minimal, which would encourage the widespread adoption of such blocking devices.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A brake cylinder parking brake for a rail vehicle brake system, said rail vehicle brake system having a brake cylinder with a push rod connected to brake rigging wherein pressurization of said brake cylinder moves said push rod in a first direction to cause said brake rigging to apply brakes on said rail vehicle, said brake cylinder having a first chamber which is pressurized to move said push rod to apply said brakes, and a second non-pressurized chamber, said brake cylinder parking brake comprising:

a. a locking member disposed within said second chamber of said brake cylinder;
   b. said push rod movable in said first direction responsive to pressurization of said first chamber;
   c. said locking member engaged with said push rod during movement of said push rod in said first direction responsive to said pressurization of said first chamber;
   d. said locking member permitting movement of said push rod in said first direction to apply said brakes; and
   e. said locking member blocking movement of said push rod in a second direction to release said brakes subsequent to movement in said first direction;
   f. a plurality of notches extending axially along a portion of said push rod; and
   g. said locking member comprising a ratcheting mechanism cooperable with said plurality of notches, said ratcheting mechanism permitting said push rod to move in said first direction, and said ratcheting mechanism blocking said push rod from subsequent movement in said second direction such that said brakes are prevented from releasing.

2. The parking brake of claim 1 further comprising:

a. a hollow sleeve having a plurality of notches extending axially along a portion thereof;
   b. said push rod received in said hollow sleeve and fixed for movement therewith; and
   c. said locking member comprising a ratcheting mechanism cooperable with said plurality of notches, said ratcheting mechanism permitting said sleeve to move in said first direction, and said ratcheting mechanism blocking said sleeve from subsequent movement in said second direction such that said brakes are prevented from releasing.

3. The parking brake of claim 2 further comprising:

a. a first position control member associated with said locking member;
   b. said first position control member urging said locking member into a first position at which said ratcheting mechanism engages said plurality of notches; and
   c. said first position control member controllable to permit said locking member to move to a second position at which said ratcheting mechanism disengages said plurality of notches to permit said sleeve to move in said second direction to release said brakes.

4. The parking brake of claim 3 further comprising:

a. a parking brake control system communicating with a pressurized volume;
   b. a signal pipe communicating between said first position control member and said parking brake control system, said first position control member controllable via pressure; and
   c. said parking brake control system controllable to selectively communicate said pressurized volume with said control pipe to control said first position control member and thus the position of said locking member to selectively engage and disengage said ratcheting member and said plurality of notches.

5. The parking brake of claim 4 wherein said rail vehicle brake system includes a brake pipe and further comprising:

a. said brake pipe in communication with said parking brake control system; and
   b. said control system communicating said pressurized volume with said signal pipe responsive to a predetermined pressure in said brake pipe such that such that said locking member is moved from said first position to said second position automatically upon occurrence of said predetermined pressure in said brake pipe.

6. The parking brake of claim 3 further comprising:

a. a second position control member associated with said locking member;
   b. said second position control member urging said locking member to said second position at which said ratcheting mechanism disengages said plurality of notches; and c. said second position control member moving said locking member to said second position responsive to controlling said first position member to permit said locking member to be moved to said second position.

7. The parking brake of claim 4 wherein said rail vehicle brake system includes a brake pipe and further comprising:
   a. said brake pipe in communication with said parking brake control system; and
   b. said control system connecting said pressurized volume with said signal pipe responsive to a predetermined pressure in said brake pipe such that such that said first position control member is controlled to permit said locking member to move from said first position to said second position; and
   c. wherein said second position control member moves said locking member to said second position automatically upon occurrence of said predetermined pressure in said brake pipe.

8. The parking brake of claim 1 further comprising a manual control member associated with said control system to manually effect disengagement said ratcheting member from said plurality of notches to permit said sleeve portion to move in said second direction to release said brakes.

9. A brake cylinder parking brake for a rail vehicle brake system, said rail vehicle brake system having a brake cylinder with a push rod connected to brake rigging wherein pressurization of said brake cylinder moves said push rod in a first direction to cause said brake rigging to apply brakes on said rail vehicle, said brake cylinder having a first chamber which is pressurized to move said push rod to apply said brakes, and a second non-pressurized chamber, said brake cylinder parking brake comprising:
   a. a locking member disposed within said second chamber of said brake cylinder;
   b. said locking member permitting movement of said push rod in said first direction to apply said brakes;
   c. said locking member selectively engageable to prevent movement of said push rod in a second direction to release said brakes subsequent to movement in said first direction;
   d. a hollow sleeve having a notched portion;
   e. said push rod received in said hollow sleeve and fixed for movement therewith;
   f. said locking member comprising a ratcheting mechanism cooperable with said notched portion to permit said sleeve to move in said first direction, and selectively engageable with said notched portion to block said sleeve from subsequent movement in said second direction such that said brakes are prevented from releasing;
   g. a first position control member associated with said locking member;
   h. said first position control member urging said locking member into a first position at which said ratcheting mechanism engages said notched portion;
   i. said first position control member controllable to permit said locking member to move to a second position at which said ratcheting mechanism disengages said notched portion to permit said sleeve to move in said second direction to release said brakes;
   j. a parking brake control system communicating with a pressurized volume;
   k. a signal pipe communicating between said first position control member and said parking brake control system, said first position control member controllable via pressure;
   l. said parking brake control system controllable to selectively communicate said pressurized volume with said control pipe to control said first position control member and thus the position of said locking member to selectively engage and disengage said ratcheting member and said notched portion;
   m. wherein said rail vehicle brake system has a brake pipe and said brake pipe communicates with said parking brake control system;
   n. said control system connecting said pressurized volume with said signal pipe responsive to a predetermined pressure in said brake pipe such that such that said first position control member is controlled to permit said locking member to move from said first position to said second position;
   o. said second position control member moves said locking member to said second position automatically upon occurrence of said predetermined pressure in said brake pipe;
   p. brake pipe check valve controlling communication between said signal pipe and at least one of said brake pipe, said pressurized volume, and the atmosphere;
   q. said brake pipe check valve connecting said signal pipe to said pressurized volume when pressure in said brake pipe is less than a predetermined amount; and
   r. said pipe check valve connecting said signal pipe to the atmosphere when pressure in said brake pipe is greater than a predetermined amount.

\* \* \* \* \*

UNITED STATES PATENT AND TRADEMARK OFFICE
CERTIFICATE OF CORRECTION

PATENT NO. : 6,854,570 B2
DATED : February 15, 2005
INVENTOR(S) : Connell It is certified that error appears in the above-identified patent and that said Letters Patent is hereby corrected as shown below:

Column 12,
Line 42, after "said", please insert -- brake --.

Signed and Sealed this

Eighth Day of November, 2005

JON W. DUDAS
*Director of the United States Patent and Trademark Office*